2,845,417
HYDROXYALKYLATION OF UNGELATINIZED STARCHES AND DEXTRINS IN AQUEOUS, WATER-MISCIBLE ALCOHOLS

Carl C. Kesler and Erling T. Hjermstad, Cedar Rapids, Iowa, assignors to Penick & Ford, Ltd., Incorporated, Cedar Rapids, Iowa, a corporation of Delaware No Drawing. Application October 6, 1955
Serial No. 539,014

3 Claims. (Cl. 260—233.3)

This invention relates to the preparation of suspensions of partial hydroxyalkyl ether derivatives of ungelatinized starches and dextrins in water-miscible alcohols and is particularly concerned with the partial etherification of starch or modifications thereof in the native granule form with hydroxyalkylating agents and the improved products resulting from these reactions.

This application is a continuation-in-part of our copending application Serial No. 306,308, filed August 25, 1952, and now abandoned.

The preparation of hydroxyalkyl ether derivatives of starch has been described in several publications and patent specifications. Processes for etherifying cellulose have also been described in the literature, but such processes are usually not applicable to starch. The older processes for etherifying starch required swelling or gelatinizing of starch in water solutions of strong alkali. The hydroxyalkylation was then accomplished by reacting the highly alkaline, gelatinized starch with alkylene oxides or monohalohydrins. The resulting hydroxyalkyl starch ethers are in the gelatinized or solvated condition and require additional processing steps in order to purify them. Such processing steps include precipitation of the product with alcohols or other water-miscible solvents, dialysis of alkali or salt from the water solution of the product, evaporating to dryness, and grinding the dried product to a powdered state. Due to the difficulty, cost, and special equipment required for purifying and drying gelatinized or solvated reaction products, the hydroxyalkyl derivatives of starches made by such methods have not been produced commercially, though such derivatives have been known for at least three decades.

U. S. Patents Nos. 2,516,632, 2,516,633 and 2,516,634 describe the preparation of partial hydroxyalkyl ether derivatives of starch in the native, unswollen, granule form by reacting alkylene oxides with starch in the presence of varying proportions of water and alkaline catalysts under conditions adjusted to prevent swelling or gelatinization. In one of these processes small proportions of alkylene oxides are combined with unswollen, granule starch in a water suspension without swelling the reaction product. The proportion of hydroxyalkyl groups which can be introduced into unswollen, granule starch suspended in water is limited by the tendency of the product to swell or gelatinize at lower temperatures with increasing substitution of hydroxyalkyl groups. Therefore, higher proportions of alkylene oxides can be combined with unswollen, granule starch in the presence of moisture insufficient to swell the reaction product. The reaction of dextrins having cold-water-swelling characteristics by these processes also requires the condition of moisture insufficient to gelatinize. Due to the low boiling points of ethylene and propylene oxide such reactions must be conducted in gas-tight equipment. Such equipment should also be able to withstand moderate pressures and be capable of agitating the dry starch and maintaining uniform temperatures in the starch.

We have discovered a new method of preparing cold water gelatinizing hydroxyalkyl derivatives of unswollen, granule starches and dextrins without the use of gas-tight, pressure type equipment. We have found that very efficient reactions between hydroxyalkylating agents, such as alkylene oxides or monohalohydrins, and unswollen, native, granule starch or modifications thereof in the original granule form can be conducted in water-miscible, monohydroxy alkanes (e. g., methanol or ethanol) which contain dissolved alkali and a minor proportion of water. While it is generally known that such water-miscible alcohols are reactive to alkylene oxides or monohalohydrins in the pressure of dissolved alkali and readily yield glycol ethers of the alcohols, we have made the surprising discovery that when a high proportion of granule starch or a modification thereof in the granule form is suspended in such alcohols containing dissolved alkali and minor proportions of water the hydroxyalkylating agents combine preferentially with the starch and efficiently produce partial hydroxyalkyl ether derivatives. The proportion of hydroxyalkylating agent may be so adjusted as to result in products which will swell or gelatinize in water at any desired temperature between the normal gelatinization temperature of the starch and the freezing temperature of water. We have found that the water-miscible alcohols have no tendency to swell or gelatinize hydroxyalkylated granule starch derivatives which contain either low proportions of hydroxyalkyl groups or proportions high enough to result in cold-water-swelling characteristics. The hydroxyalkylated products are therefore easily filtered and dried. Most of the alcohol can be removed from the product my a simple filtration process. The alcohol remaining in the filter cake may be evaporated and the product is obtained in the form of a dry, moble white powder consisting of hydroxyalkylated starch in its original granule form.

In one embodiment our process consists of preparing a mixture of unswollen, granule starch or a modification thereof (e. g., dextrinized starch) in the unswollen, granule form; a water-miscible, monohydroxy alkane, alcohol, such as methanol, ethanol, propanols, or mixtures thereof; an alcohol-soluble alkali such as sodium or potassium hydroxide; a hydroxyalkylating agent such as ethylene oxide, propylene oxide, or ethylene chlorohydrin; and a proportion of water insufficient to result in swelling or gelatinization of the reaction product; and heating and agitating the mixture until substantially all of the hydroxyalkylating agent has been reacted. We have found that the more efficient hydroxyalkylation of the starch occurs when the ratio of weight of starch to weight of alcohol-water solution is around 1 or greater. The proportion of hydroxyalkylating agent used will depend upon the product characteristics which are desired. The gelatinization temperature range of the starch is lowered as the proportion of hydroxyalkyl groups introduced into the starch is increased. While in the process of U. S. Patent No. 2,516,633 it is not feasible to react more than 5% by weight of ethylene oxide with starch which is suspended in water, the reaction of 5% by weight or higher proportions of ethylene oxide or molar equivalents of other hydroxyalkylating agents is easily accomplished by our present process without swelling the hydroxyalkylated granule starch product. The use of from 10–15% of ethylene oxide based on the starch will result in products which gelatinize fully in water at temperatures around 75° F. Other hydroxyalkylating agents give similar results when they are used in molecular equivalent proportions. For example, we have found that the use of 15% ethylene oxide or 20% propylene oxide based on the starch will combine with unmodified corn starch in our new process to yield products which gelatinize instantly in water at 80° F. and form very clear, cohesive glutinous pastes while remaining at this temperature. Our present process also affords a means of conveniently producing unswollen, granule hydroxyalkyl derivatives of cold-water-swelling starch modifications such as dextrins and British gums. We have found that high and low proportions of hydroxyalkylating agents, for example 1–25% by weight of ethylene oxide or molar equivalent amounts of other hydroxyalkylating agents, will react readily and efficiently by our present process with cold-water-soluble dextrins and British gums without swelling or gelatinization of the reaction product. Generally, proportions of from .04 to .9 mole of hydroxyalkylating agent per anhydroglucose mole of starch or dextrin are suitable.

The proportion of alkali required in our process depends somewhat on the type of hydroxyalkylating agent used. When the hydroxyalkylation is achieved by means of monohalohydrins, the alkalinity of the suspension must be maintained by adding an excess amount of alkali at the start or at the intervals in order to replace the alkali consumed by hydrolysis of the halide radical. When alkylene oxides are used it is sufficient to add enough alkali to neutralize the acidity of the starch or starch modification and to bring the starch into an alkaline state. In general, we have found that high reaction efficiency is obtained by the use of from .5% to 5% sodium hydroxide or equivalent alkaline reagent based on the starch when the hydroxyalkylation is brought about by alkylene oxide. Higher proportions may be used provided the temperature is maintained at low levels; however, we prefer to maintain relatively low levels of alkalinity when reacting with alkylene oxide in order to avoid excessive amounts of salt when the reaction product is neutralized with acid. In general, the alkali metal hydroxides and particularly sodium and potassium hydroxide are preferred, although other alkali materials, such as the alkaline earth metal hydroxides can be used with some success. If desired, the alkali can be formed in situ by adding appropriate reagents. The alkali can also be added incrementally when desirable. All that is necessary is that the reaction medium be at an alkaline pH, and contain a sufficient concentration of hydroxyl ions to promote the reaction. Generally, a proportion of unreacted alkali of from .004 to .20 mole per anhydroglucose mole of starch or dextrin is maintained during the reaction. Preferably, substantially all of the alkali is dissolved in the aqueous alcohol.

A minor proportion of water is desirable in the reaction mixture. The proportion of water must be below that which would cause gelatinization of the hydroxyalkylated product under the particular conditions maintained. The proportion of water which may be used without causing gelatinization of the hydroxyalkylated product depends on the degree of substitution of hydroxyalkyl groups which is achieved, the temperature which is maintained, the proportion of alkali present, and the kind of alcohol used. For the preparation of hydroxyalkylated starches having cold-water-swelling characteristics we have found suitable proportions of water within the range of from 5 to 25% of the weight of alcohol used. For the preparation of hydroxyalkylated starches of lower degree of substitution, higher proportions of water may be used, possibly up to one part by weight of water to each part by weight of alcohol, though in any case it is required that the amount of water be insufficient to cause gelatinization to the product. In the preferred embodiments the alcohol and water are completely miscible in the proportions used and provide a single phase reaction medium. Such alcohols as methanol, ethanol and isopropanol are miscible with water in all proportions and are therefore preferred.

The temperature which may be maintained in our process may vary widely. We prefer to conduct hydroxyalkylations with alkylene oxides at temperatures within the range of 60° F. to 130° F. in order to minimize losses by evaporation. Higher temperatures may be used, however, preferably when less volatile hydroxyalkylating agents such as monohalohydrins are used. In any case the temperature is maintained at a level low enough to prevent degradation or depolymerization of the starch by the action of the dissolved alkali.

The time required for complete reaction by our process depends on several factors, among which are the degree of substitution of hydroxyalkyl groups which is sought, the proportion of dissolved alkali present, the temperature of the reaction mixture, the kind of hydroxyalkylating agent used, the proportion of water, and the kind of starch used. We have found that periods of time not greater than 24 hours are sufficient to obtain hydroxyalkylated starches having cold-water-swelling characteristics when commercial starches are reacted in alcohols containing around 2.5% sodium hydroxide based on the starch with the temperature maintained around 100° F.

The hydroxyalkylated starch may be left in the alkaline state or brought to a neutral condition with acid. The product may be separated from the alcohol by simple filtration followed by evaporation of the remaining alcohol from the filter cake. Salt remaining from the neutralization may be removed if desired by washing the filter cake with water-alcohol mixtures containing sufficient alcohol to prevent swelling of the product. However, the presence of minor proportions of alkali metal salts does not adversely affect the cold-water-gelatinizating character or paste properties of the hydroxyalkylated starch derivatives prepared by our process. For certain applications it is advantageous to use the suspension containing the reaction products without separation or purification of its constituents. When an alcohol suspension of the cold water swelling hydroxyalkylated starch is added to cold water the dilution of the alcohol results in gelatinization of the starch and at the same time the alcohol delays the initial swelling until the individual granules have become separated, thus preventing the formation of lumps or aggregates of ungelatinized granules covered with a film of gelatinized starch. Lumping of this nature commonly occurs when cold water swelling colloidal materials are added to water and such lumps are often very difficult to disperse.

Any granule starch may be employed in our process. The term "granule" is intended to describe starches which still have their original granule structure intact, even though they may have been modified in many respects. All starches occur in nature in the form of characteristically shaped particles which are called granules. This granule structure is retained even during such treatments as modifying by means of acids or oxidizing agents or during the process of converting starches to dextrins and gums. Granule starches therefore include unmodified starches, acid-modified thin-boiling starches, oxidized starches, bleached starches, British gums, dextrins, and substantially all of the common commercial starches which exist or are produced in their original granule form. We also include the different varieties of starch, such as corn starch, potato starch, wheat starch, rice starch, waxy-maize starch, tapioca starch, etc., whether modified or unmodified, which exist or are produced in their original granule form. We find that all such starches respond to the present process and bring about the results described.

The term "hydroxyalkylating agent" is intended to cover epoxide starch hydroxyalkylating agents such as monofunctional epoxides of lower aliphatic hydrocarbons as well as halohydrin starch hydroxyalkylating agents like the monohalohydrins of lower aliphatic hydrocarbons. Examples of the former are ethylene oxide and 1,2 epoxy propane, and of the latter is ethylene chlorohydrin, but other epoxides and halohydrins may be used, and will preferably contain less than five carbon atoms. The alcohols which may be used in our process include the monohydroxy alkanes having less than five carbon atoms which are miscible with water in the proportions used in the process, for example, methanol, ethanol and isopropanol, or mixtures of these alcohols, for example, denatured ethanol containing 10% of methanol.

Our new process for preparing hydroxyalkylated derivatives of granule starch has several desirable advantages. The dilution of alkylene oxides with alcohols lowers the vapor pressure considerably, making possible the preparation of cold-water-swelling starches in simple equipment such as tanks equipped with agitators. Any of the common commercially available unswollen, granule starches, unswollen or granule starch modification, may be used and no pre-treatment of the starch with salt of alkali is necessary. Another distinct advantage in our new process involves the hydroxyalkylation of acid starch modifications such as dextrins and starch gums. Such materials are produced by roasting dry starch with small amounts of acid and therefore alkali cannot be incorporated in the starch granules before dextrinization. The addition of alkali to dextrins is very difficult since they tend to swell when wet, producing lumps of gelatinized material. The dextrins also have very low moisture contents and the presence of moisture is necessary in order to secure efficient hydroxyalkylation. Due to their cold-water swelling tendency it is difficult to add water to the dextrins, since the water tends to form lumps of gelatinized material which binds the water and prevents it from permeating the dextrin uniformly. Our new process avoids these difficulties. No pre-treatment of the dextrin is necessary, since alkali and necessary water are added to the alcohol suspension and the acidity of the dextrin is neutralized and moisture content increased without any tendency to swell the dextrin.

Another advantage in our new process lies in the ease with which uniformly substituted starch derivatives may be obtained. Since the reaction is conducted in a fluid suspension uniform temperature and uniform distribution of alkali and moisture is maintained at all times during the reaction. For these reasons hydroxyalklations of granule starch which are conducted in alcohols tend to be more efficient and products having excellent water-paste clarity and cohesiveness are obtained from all types of granule starches and modifications having granule form.

Another advantage in our new process is in the ease with which monohalohydrins may be used to produce hydroxyalkyl derivatives. Since monohalohydrins require sufficient alkali to neutralize the acidity produced by hydrolysis of the halide radical, it is difficult to introduce sufficient alkali into dry starches to secure a degree of hydroxyalkylation sufficient to obtain cold-water-gelatinizing derivatives. In our present process the presence of large proportions of alkali is feasible and sufficient alkali may be easily added to secure cold-water-swelling hydroxyalkylated products by use of monohalohydrins.

Our new process is especially well adapted to the preparation of compositions consisting of cold-water gelatinizable hydroxyalkylated granule starches suspended in water-miscible alcohols. The same alcohol may first serve as the medium in which the reaction is conducted and then as the vehicle or suspending medium for the finished composition. Compositions of this type are ideally suited for use as liquid laundry starches. Fluid suspensions containing as high as 70% by weight of hydroxyalkylated granule starch solids can be made by using alcohols. When a small amount of this composition is stirred into a large volume of cold water the hydroxyalkylated granule starch gelatinizes completely and lump formation is prevented by the presence of alcohol. The cold-water paste which is formed can be used immediately for starching fabrics. No heating or cooking is necessary. Because of the extremely high solids content possible in fluid suspensions of hydroxyalkylated granule starch in alcohols such compositions have a marked advantage over water-based liquid laundry starches which are generally limited to 8% to 12% starch solids concentrations. This advantage lies in the greatly lowered storage space required per unit weight of starch. For example, a pint of our fluid alcohol suspension of cold-water gelatinizable hydroxyalkylated starch with 57% starch solids contains 12 ounces of starch. Most of the commercial liquid laundry starches now being manufactured contain around 1.5 to 2 ounces of dry basis starch per pint. Still another advantage is the perfect resistance to biological spoilage and freezing of our alcohol compositions.

When our hydroxyalkylated starch-alcohol composition is to be used as a laundry starch it is usually desirable to include small proportions of lubricants or softeners. Suitable lubricants which may be used are alcohol-soluble soaps, tallows, waxes, etc.

When cereal starches such as corn starch, wheat starch, rice starch, etc. are cooked in common commercial concentrations and then allowed to cool and age the pastes set and form and opaque gel or tend to lose the ability to flow freely. At the same time the phenomenon termed "retrogradation" takes place; this involves the formation in the paste of insoluble crystalline material which will not readily redisperse on reheating. We have found that by hydroxyalkylating unswollen, granule cereal starch the gelling and retrograding tendency is substantially reduced and the cooked pastes have a translucent, glutinous character similar to pastes of the glutinous starches such as tapioca starch, potato starch, waxy-maize starch, etc. The dried films formed from cooked pastes of hydroxyalkylated granule starches have a greater clarity, smoothness, and softness as compared with films of cereal starch pastes. They have an increased tendency to redissolve in water and are more readily removed from sized fabrics during desizing treatments.

The non-gelling and cohesive character of water pastes of our hydroxyalkylated granule starches is desirable in the formulation of adhesives. For many purposes such as in veneer glues the adhesive must possess the ability to flow at relatively high concentrations. Ordinary cereal starches and many of their modifications set-up or gel in high concentrations or lack the necessary flow properties.

The treatment of dextrins and starch gums by our present process improves them considerably in many respects. Ordinary dextrins, particularly those made from cereal starches, such as corn starch, set-back or stiffen on standing after being cooked in high solids concentrations in water. Dextrins which set-back or stiffen much on standing are not suitable for such applications as envelope and postage stamp adhesives, since the viscosity of the cooked dextrin must be kept within rather narrow limits to insure proper functioning of the automatic machinery used in applying the adhesive to envelopes and stamps. They would also have a tendency to clog feed lines especially during periods when the machinery is shut down. We have found that cereal starch dextrins which are hydroxyalkylated to a small degree, for example by using 1 to 5% by weight of ethylene oxide on the dextrin by our present process, are suitable for use in such adhesives.

The higher substituted cold-water gelatinizable hydroxyalkylated granule starches which may be produced by our present process produce smooth, homogenous pastes when dispersed in cold water. These pastes are similar to those obtained on cooking glutinous starches such as tapioca starch or waxy-maize starch at temperatures above the normal starch gelatinization temperature range. The pastes are exceptionally translucent, cohesive, and high in adhesive power and do not have any of the undesirable coarseness or rough texture of pastes of cook-dried or pregelatinized starch. Our hydroxyalkylated granule starches containing a sufficient proportion of hydroxyalkyl groups will gelatinize instantly in cold water which is either acidic, neutral, or alkaline. The starch swells completely, that is, there are substantially no unswollen granules or aggregates of granules which remain unswollen. These starches may be used as thickeners or adhesives in various commercial applications, for example, well-drilling fluids, printing pastes, water-based paints, wallpaper adhesives, textile and paper sizes, etc. They are especially useful in application where heating or cooking of pastes is not feasible.

The following examples are presented by way of specific illustration of the various embodiments to which this invention is susceptible.

Example I

Two hundred grams of commercial unmodified powdered corn starch is suspended in a single phase liquid reaction medium comprising 133 grams of commercial denatured ethanol (Formula S. D. A-1) containing 5% moisture and 6 grams of dissolved sodium hydroxide. Thirty-two grams of ethylene oxide is then added and the suspension is agitated in a closed flask at 100° F. for 24 hours. The alkali is then neutralized by adding acetic acid. When a portion of the suspension is stirred into 10 to 20 times its volume of water at 80° F. the hydroxyalkylated starch gelatinizes without lumping to form a translucent, cohesive paste which does not retrograde or form a gel on ageing.

Example II

Forty grams of 1,2 epoxy propane is used instead of 32 grams of ethylene oxide in Example I with a reaction temperature of 130° F.

Example III

One hundred grams of powdered unmodified corn starch containing 10% moisture is suspended in 70 grams of isopropanol containing 7.7 grams of water and 3 grams of dissolved sodium hydroxide. Fifteen grams of ethylene oxide is added and the suspension is agitated in a closed flask at 100° F. for 23 hours. The reaction mixture contained a single liquid phase having all the alkali dissolved therein. The alkali is neutralized with acid, the starch filtered and washed using an 80% ethanol solution until substantially free of salt and the starch dried. The product is obtained in the form of a white powder, consisting of hydroxyethylated starch in its unswollen, granule form. When this product is added to water at 80° F. it gelatinizes rapidly to form a translucent, cohesive paste which does not retrograde or gel on ageing.

Example IV

Two hundred grams of unmodified wheat starch containing 10% moisture is suspended in 170 grams of commercial denatured ethanol (S. D. A-1) containing 5% moisture and 5 grams of dissolved sodium hydroxide. Thirty grams of ethylene oxide is added and the suspension is agitated in a closed flask for 24 hours at 100° F. The suspension is neutralized with acetic acid until it produces a pH around 6.0 when added to distilled water, then with hydrochloric acid until it produces a pH around 4.0 when added to distilled water. The starch is then filtered, washed with 90% ethanol solution, and dried. The product is obtained as a mobile, white powder consisting of hydroxyethylated starch in its original granule form. When this product is added to water at 80° F. it gelatinizes to form a translucent, cohesive paste which does not retrograde or form a gel on ageing.

Example V

Two hundred grams of unmodified waxy-maize starch is used in Example IV instead of 200 grams of wheat starch.

Example VI

Two hundred grams of high grade tapioca starch and 133 grams of denatured ethanol is used in Example IV instead of 200 grams of wheat starch and 170 grams of denatured ethanol.

Example VII

Two hundred grams of 95% soluble Canary corn dextrin containing 2% moisture is suspended in 133 grams of ethanol containing 5% moisture and 2 grams of dissolved sodium hydroxide. Ten grams of ethylene oxide is added and the suspension is agitated in a closed flask for 24 hours at 100° F. The alkali is then neutralized with acid, the dextrin filtered and washed with 95% ethanol, and dried. When this product is cooked with heat in a 65% solids concentration in water and then cooled to room temperature it remained fluid without stirring for two weeks while the original dextrin, when cooked in a 65% solids concentration was aged, set-back and became non-fluid within 24 hours.

Example VIII

One hundred grams of commercial, unmodified corn starch is suspended in 100 grams of commercial denatured ethyl alcohol (Formula S. D. A-1) containing 15 grams of dissolved sodium hydroxide. To this are added 27.4 grams of ethylene chlorohydrin and the suspension is agitated in a closed flask for 20 hours at 130° F. The excess alkali is then neutralized with acid, the starch filtered, washed with denatured alcohol, and dried. The product is obtained as a white powder consisting of hydroxyethylated starch in its original granule form. When the dried product is suspended in water it swells at room temperature and gelatinizes at 115–120° F. to form a translucent, cohesive paste which does not retrograde or form a gel on ageing.

Example IX

Two hundred grams of a 60% soluble white corn dextrin is suspended in 150 grams of commercial denatured ethyl alcohol (Formula S. D. A-1) containing 16.5 grams of dissolved potassium hydroxide. Eighteen grams of ethylene chlorohydrin are added and the suspension is agitated in a closed flask for 24 hours at 110° F. The excess alkali is then neutralized with acetic acid and the dextrin filtered, washed with denatured alcohol, and dried. When this product is cooked with heat in a 50% solids concentration in water and then cooled to room temperature it remains fluid for several weeks. The original dextrin when cooked in a 50% concentration, cooled, and aged, sets-back to a pasty, non-fluid condition within 24 hours.

Example X

Two hundred grams of commercial unmodified powdered corn starch containing 5% moisture is suspended in 200 grams of commercial denatured alcohol (Formula S. D. A-1) containing 4 grams of dissolved sodium hydroxide. Fifty grams of ethylene oxide are added and the suspension is agitated in a closed vessel for 48 hours at 110° F. The alkali is then neutralized with acid, the product filtered, and the filter cake washed with 95% ethanol and dried. The product gelatinizes instantly on contact with cold water to form a translucent, very cohesive, non-gelling, non-retrograding paste.

While in the foregoing specification specific embodiments of this invention have been set forth in considerable detail for purposes of illustration, it will be apparent to those skilled in the art that many of the details set forth can be varied widely without departing from the spirit of the invention.

We claim:

1. The process of preparing ungelatinized hydroxyalkyl derivatives of a granule starch material selected from the group consisting of granule starches and granule starch dextrins, comprising forming a slurry by mixing said granule starch material with water, a completely water-miscible alcohol, and an alcohol-soluble alkali, not over one part by weight of water being present per part of acohol, said alcohol being selected from the group consisting of methanol, ethanol, and isopropanol, said alkali being selected from the group consisting of sodium and potassium hydroxide, said slurry consisting of said starch material suspended in a single liquid phase, and reacting said starch material with a starch hydroxyalkylating agent while maintaining said starch material suspended in said single liquid phase to produce a partially etherified product in a substantially ungelatinized, filterable state, said hydroxyalkylating agent being selected from the group consisting of the epoxide and the halohydrin hydroxyalkylating agents.

2. The process of claim 1 in which said hydroxyalkylating agent is ethylene oxide.

3. The process of claim 1 in which said hydroxyalkylating agent is ethylene chlorohydrin.

References Cited in the file of this patent

UNITED STATES PATENTS

| | | |
|---|---|---|
| 2,116,867 | Kreimeier et al. | May 10, 1938 |
| 2,516,634 | Kesler et al. | July 25, 1950 |
| 2,682,535 | Broderick | June 29, 1954 |

UNITED STATES PATENT OFFICE
CERTIFICATE OF CORRECTION

Patent No. 2,845,417

July 29, 1958

Carl C. Kesler et al.

It is hereby certified that error appears in the printed specification of the above numbered patent requiring correction and that the said Letters Patent should read as corrected below.

Column 2, line 12, for "pressure" read -- presence --; line 31, for "my" read -- by --; line 34, for "moble" read -- mobile --.

Signed and sealed this 28th day of October 1958.

(SEAL)
Attest:
KARL H. AXLINE
Attesting Officer

ROBERT C. WATSON
Commissioner of Patents